United States Patent
Fromme et al.

(10) Patent No.: US 7,023,174 B2
(45) Date of Patent: Apr. 4, 2006

(54) INDUSTRIAL TRUCK WITH INTEGRATED VEHICLE CONTROL AND BATTERY CHARGING SYSTEM

(75) Inventors: Georg Fromme, Hamburg (DE); Ansgar Bergmann, Bargteheide (DE); Marc Wede, Ahrensburg (DE)

(73) Assignee: STILL GmbH (DE)

( * ) Notice: Subject to any disclaimer, the term of this patent is extended or adjusted under 35 U.S.C. 154(b) by 60 days.

(21) Appl. No.: 10/391,519

(22) Filed: Mar. 18, 2003

(65) Prior Publication Data

US 2004/0017176 A1 Jan. 29, 2004

(30) Foreign Application Priority Data

Mar. 8, 2001 (DE) .......................... 101 11 233
Mar. 25, 2002 (DE) .......................... 102 13 210

(51) Int. Cl.
*H01M 10/46* (2006.01)

(52) U.S. Cl. ...................................................... 320/104
(58) Field of Classification Search ................. 320/104, 320/112, 128, 140
See application file for complete search history.

(56) References Cited

U.S. PATENT DOCUMENTS 6,220,380 B1 * 4/2001 Mita et al. ................. 180/65.1

FOREIGN PATENT DOCUMENTS

DE    196 52 950 A1    7/1998
DE    199 22 137 A1    11/2000

* cited by examiner

*Primary Examiner*—Edward H. Tso
(74) *Attorney, Agent, or Firm*—The Webb Law Firm

(57) ABSTRACT

A battery-operated vehicle, in particular to an industrial truck, includes an electronic control unit (2) and an on-board charging function. Instead of a separate charging unit, the invention teaches that the control unit (2) also regulates the charging function.

12 Claims, 1 Drawing Sheet

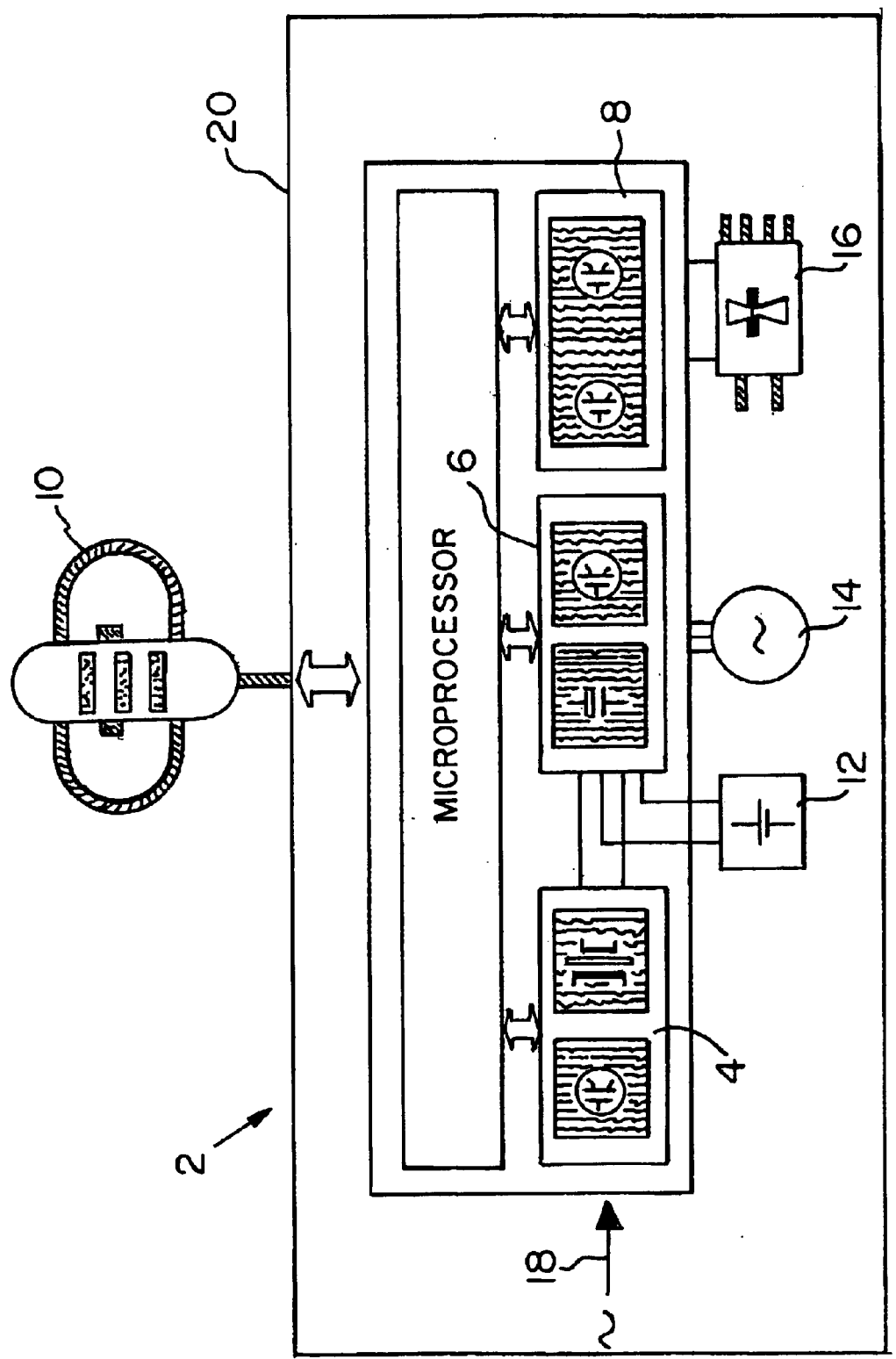

INDUSTRIAL TRUCK WITH INTEGRATED VEHICLE CONTROL AND BATTERY CHARGING SYSTEM

CROSS-REFERENCE TO RELATED APPLICATION

This application claims priority to German Application No. 102 13 210.0 filed Mar. 25, 2002, which is herein incorporated by reference in its entirety.

BACKGROUND OF THE INVENTION

1. Field of the Invention

This invention relates to a battery-operated vehicle, such as an industrial truck having an electronic control unit and with a built-in charging function.

2. Technical Considerations

Battery-operated electric vehicles, such as electric industrial trucks, must generally be brought to a charging station to recharge the battery. That is not always easy or convenient to do, especially if the next charging station is a significant distance away. Therefore, the designers of electric industrial trucks have attempted, since the very early days of such units, to include built-in charging units. These units have the advantage that the battery can be recharged at any time, anywhere there is a suitable electrical outlet.

The known art describes industrial trucks with built-in charging units. The traction battery of the vehicle can then be recharged at the next electrical outlet when the truck is not in use. It therefore becomes unnecessary to replace the battery or to provide a recharging station. These on-board charging units are generally installed in the industrial trucks in the form of separate units. The function of a charging unit is the isolated conversion of the line voltage into a direct-current voltage and of the controlled adjustment of the charging voltage or of the charge current so that it corresponds to the charge status and charging requirements of the battery. Modem units generally contain a primary switched and higher-frequency transformer. The process is controlled by a microprocessor.

DE 199 22 137 A1 describes an industrial truck with a battery block that has a data storage unit. A standard charging unit is necessary to recharge the battery.

DE 196 52 950 A1 describes an industrial truck in which the recharging device is carried by the vehicle in the form of a component of the drive control system. The traction motor has a very special winding that is also used for charging. A specially equipped motor of this type with a special winding and taps is relatively expensive on account of the small size of the manufacturing runs.

On the other hand, the known art also describes battery-operated industrial trucks that are equipped with one or more electronic control units. The most important functions of the control units include: actuation of the drive motors; actuation of hydraulic elements such as proportional valves; interfaces for control and operator information; additional functions, e.g., actuation of relays or brakes; and monitoring and control of the vehicle.

Current control systems are generally equipped with one or more microprocessors. The scope of the functions and the size of the control units vary with the complexity of the vehicle. Under increasing cost pressure, just as with the other components of an industrial truck, emphasis has been placed on minimizing the cost and complexity of the hardware used in the control units, especially for mass-produced vehicles in the lower power range.

Because built-in recharging units represent a significant cost factor precisely in these small units, it is an object of the invention to provide a battery-operated industrial truck with a built-in recharging unit that can be manufactured more economically.

SUMMARY OF THE INVENTION

The invention teaches that the above object can be accomplished by a vehicle that has the characteristics disclosed in claim 1. Suitable embodiments and developments of the invention are disclosed in the subclaims.

The invention teaches that the vehicle's own existing control unit also performs the charging function. Given the above mentioned cost pressure, it is appropriate to combine the control unit and the on-board charging unit to the maximum possible extent, taking advantage of the fact that, when the above two units are constructed separately, there are two of several units on the vehicle. For example, both units have a microprocessor, contain current measurement devices, a power supply, and additional similar assemblies and modules.

The invention, therefore, teaches that the components of the vehicle control system that are required for the operational use of the vehicle can also be used for the battery charging system. The devices that are required for the recharging process are essentially those that are already present in the vehicle control system, as well as a few additional elements such as a transformer. The motor or its components are not used during the recharging process. Therefore any desired type of motor can be used, regardless of whether the motor operates on direct current, alternating current, or three-phase current.

Preference is given to the use of an AC-DC converter in the form of a separate voltage transformer, which brings the line voltage down to the battery voltage. Therefore, a motor coil (in the form of a choke coil, in the form of a special coil with taps) like the one in DE 196 52 950 A1 need not be used. It is advantageous to use a high-frequency switched voltage transformer because these units are economical and take up only a small amount of space. Transformers of this type work in the range above 1 kHz, preferably, for example, at 30 kHz. The integrated voltage transformer taught by the invention is, therefore, designed for use with the charging function and not traction operation. The invention teaches that there is also no need for converters or pulse-controlled inverters as required by the prior art described in DE 196 52 950 A1, in addition to the special motor coils.

Because the charging process can only take place when the vehicle drive system is inactive, for safety reasons, among others, the invention teaches that the systems of the control unit that are already shut down can be used for the charging function.

In a first exemplary embodiment of the invention, the control unit of an industrial truck need only be expanded to include a voltage transformer which transforms the line voltage into a direct-current voltage that corresponds to the level of the battery voltage. The actuation of the transformer and the control of the charging process is performed by the microprocessor of the vehicle control system. In addition, components of the power controller for the traction drive, for example, can also be used for the charging process. For example, the ammeter that is already present can be used to measure the charging current.

In one embodiment of the invention, the data concerning battery load acquired by the vehicle control system during operation can also be used, with due consideration for the battery parameters, to control the charging process. For example, the current-voltage profile can be optimally adapted to the current charge or load status of the battery. On the other hand, when operation resumes after a charging process, the vehicle control system and, thus, the battery discharge indicator, have all the information they need about the charge status of the battery, which means that a secure monitoring of the charge status is ensured.

The invention has the following advantages over known systems:
- cost reduction compared to the solution of the prior art,
- smaller volume and thus lower space requirement in the vehicle,
- reduced risk of failure on account of the reduced number of components, and
- protection and more efficient utilization of the battery by control of the charging and discharging process by means of the same microprocessor.

In one embodiment of the invention, the voltage transformer can be fully integrated into the vehicle control unit. The entire unit can, therefore, be manufactured more economically than a conventional unit with a separate control system and a separate on-board charging unit.

In another embodiment, the voltage transformer can be an independent add-on component (an assembly or module that can be added or retrofitted), and can be docked to the control unit by means of a suitable system of contacts. This arrangement is somewhat more complex and expensive, although it offers the opportunity to provide an optional on-board charging unit, so that units that previously did not have a charging unit can be retrofitted. Different units can also be offered in various power ranges, as a result of which it becomes possible to respond optimally to an operator's requirements for its individual fleet of industrial trucks.

BRIEF DESCRIPTION OF THE DRAWING

The FIGURE schematically discloses an industrial truck having a control unit of the invention incorporating an integrated charging unit.

DESCRIPTION OF THE PREFERRED EMBODIMENT

One exemplary embodiment of the invention is explained in greater detail below with reference to the accompanying FIGURE. The FIGURE shows a control unit 2 as taught by the invention for a battery-operated industrial truck 20 with an integrated charging unit. The control unit 2 in this case contains a microprocessor (control unit), a transformer 4 as the charging unit, a power inverter power unit 6 for traction operation, and a driver 8 for additional functions. The transformer 4 can be a primary switched transformer with control-to-load isolation. The power inverter section 6 has an intermediate circuit and a three-phase bridge. The control unit 2 interacts with a tow bar 10, by means of which the operator enters the drive commands and the commands for raising and lowering the load or other commands, and also with the battery 12, the three-phase motor 14 of the traction drive, and with additional valves or relays, etc., for additional functions, which, in this case, are combined in the representative component designated 16. To the left in the FIGURE is a power connection 18 for connection to a standard power outlet that can be used for charging the battery 12. The drawing shows clearly that, in this embodiment of the invention, there need not be a completely independent charging unit, but that parts of the control unit 2 can also be used for charging. Thus, for example, the microprocessor can be used for the control and regulation of the charging current. Components of the power inverter section 6, such as the ammeter or control units, for example, can also be used to charge the battery 12. Therefore, the battery 12 is not connected directly to the charging unit 4, but to the power inverter section 6. The battery 12 can also be connected directly to the charging unit 4, however. The microprocessor of the control unit 2 also regulates this transformer 4.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A battery-operated vehicle having an integrated vehicle control and battery charging system, comprising:
   an electronic control unit; and
   a charging unit integrated with the control unit;
   wherein components of the control unit required for operational use of the vehicle are also used by the charging unit to charge vehicle batteries, and wherein shared components of the control unit and charging unit comprise at least one component selected from the group consisting of a microprocessor, a current measurement device, and a power supply.

2. The vehicle as claimed in claim 1, wherein the charging unit includes a voltage transformer installed in the vehicle and actuated by the control unit.

3. The vehicle as claimed in claim 1, wherein the control unit uses stored operating data to control the charging and/or to control the traction operation.

4. The vehicle as claimed in claim 2, wherein the voltage transformer is integrated into the vehicle.

5. The vehicle as claimed in claim 2, wherein the voltage transformer is an independent component.

6. The vehicle as claimed in claim 1, wherein the vehicle is an industrial truck.

7. The vehicle as claimed in claim 2, wherein the voltage transformer comprises a high-frequency switched voltage transformer which is an AC-DC transformer.

8. The vehicle as claimed in claim 2, wherein the control unit uses stored operating data to control the charging and/or to control the traction operation.

9. The vehicle as claimed in claim 3, wherein the voltage transformer is integrated into the vehicle.

10. The vehicle as claimed in claim 3, wherein the voltage transformer is an independent component.

11. An industrial truck, comprising:
    a tow bar;
    a battery; and
    a control unit having an integrated charging unit, comprising:
    an AC to DC voltage transformer;
    a microprocessor
    a power inverter unit connected to the transformer; and
    a power connection connectable to a power outlet,
    wherein the battery is connected to the power inverter unit, and
    wherein the control unit and integrated charging unit share the same microprocessor.

12. A battery-operated vehicle having an integrated vehicle control and battery charging system, comprising:
    an electronic control unit; and
    a charging unit integrated with the control unit,
    wherein components of the control unit required for operational use of the vehicle are also used by the charging unit to charge vehicle batteries, wherein the shared components comprise a microprocessor, a current measurement device, and a power supply.

* * * * *

UNITED STATES PATENT AND TRADEMARK OFFICE
CERTIFICATE OF CORRECTION

| | | |
|---|---|---|
| PATENT NO. | : 7,023,174 B2 | Page 1 of 1 |
| APPLICATION NO. | : 10/391519 | |
| DATED | : April 4, 2006 | |
| INVENTOR(S) | : Fromme et al. | |

It is certified that error appears in the above-identified patent and that said Letters Patent is hereby corrected as shown below:

On Title Page, Item (30) Col. 1 Foreign Application Priority Data, the first priority document information "Mar. 8, 2001 (DE) ................101 11 233" should be deleted.

Title Page, [56] References Cited, the following should be added:
-- OTHER DOCUMENTS
A merriam-Webster's Ninth New Collegiate Dictionary, 1990 --

Signed and Sealed this

Twenty-ninth Day of August, 2006

JON W. DUDAS
*Director of the United States Patent and Trademark Office*